United States Patent
Faraki et al.

(10) Patent No.: US 11,947,626 B2
(45) Date of Patent: Apr. 2, 2024

(54) FACE RECOGNITION FROM UNSEEN DOMAINS VIA LEARNING OF SEMANTIC FEATURES

(71) Applicant: NEC Laboratories America, Inc., Princeton, NJ (US)

(72) Inventors: Masoud Faraki, San Jose, CA (US); Xiang Yu, Mountain View, CA (US); Yi-Hsuan Tsai, Santa Clara, CA (US); Yumin Suh, Santa Clara, CA (US); Manmohan Chandraker, Santa Clara, CA (US)

(73) Assignee: NEC Corporation, Tokyo (JP)

( * ) Notice: Subject to any disclaimer, the term of this patent is extended or adjusted under 35 U.S.C. 154(b) by 343 days.

(21) Appl. No.: 17/519,950

(22) Filed: Nov. 5, 2021

(65) Prior Publication Data

US 2022/0147765 A1   May 12, 2022

Related U.S. Application Data

(60) Provisional application No. 63/114,013, filed on Nov. 16, 2020, provisional application No. 63/111,842, filed on Nov. 10, 2020.

(51) Int. Cl.
   *G06F 18/214*   (2023.01)
   *G06N 3/04*     (2023.01)
   *G06V 40/16*    (2022.01)

(52) U.S. Cl.
   CPC .......... *G06F 18/214* (2023.01); *G06N 3/04* (2013.01); *G06V 40/161* (2022.01)

(58) Field of Classification Search
   None
   See application file for complete search history.

(56) References Cited

U.S. PATENT DOCUMENTS 9,514,356  B2 *  12/2016  Lu ................... G06V 10/7715
10,169,646 B2 *   1/2019  Ganong ............ G06Q 30/0277
(Continued)

OTHER PUBLICATIONS

Dou et al., "Domain Generalization via Model-Agnostic Learning of Semantic Features", 33rd Conference on Neural Information Processing Systems (NeurIPS 2019), Vancouver, Canada, Oct. 29, 2019, pp. 1-12.

(Continued)

*Primary Examiner* — Anand P Bhatnagar
(74) *Attorney, Agent, or Firm* — Joseph Kolodka

(57) ABSTRACT

A method for improving face recognition from unseen domains by learning semantically meaningful representations is presented. The method includes obtaining face images with associated identities from a plurality of datasets, randomly selecting two datasets of the plurality of datasets to train a model, sampling batch face images and their corresponding labels, sampling triplet samples including one anchor face image, a sample face image from a same identity, and a sample face image from a different identity than that of the one anchor face image, performing a forward pass by using the samples of the selected two datasets, finding representations of the face images by using a backbone convolutional neural network (CNN), generating covariances from the representations of the face images and the backbone CNN, the covariances made in different spaces by using positive pairs and negative pairs, and employing the covariances to compute a cross-domain similarity loss function.

20 Claims, 8 Drawing Sheets

(56) References Cited

U.S. PATENT DOCUMENTS

| | | | | |
|---|---|---|---|---|
| 10,755,084 | B2* | 8/2020 | Ganong | G06Q 30/0241 |
| 11,210,537 | B2* | 12/2021 | Koivisto | G06V 10/46 |
| 11,315,254 | B2* | 4/2022 | Guo | G06N 3/045 |
| 11,676,719 | B2* | 6/2023 | Feczko | G16H 20/70 |
| | | | | 706/12 |
| 2017/0124385 | A1* | 5/2017 | Ganong | G06F 16/50 |
| 2019/0080155 | A1* | 3/2019 | Ganong | G06V 40/167 |
| 2020/0058137 | A1* | 2/2020 | Pujades | G06V 40/23 |
| 2020/0219619 | A1* | 7/2020 | Feczko | G16H 30/40 |
| 2021/0225000 | A1* | 7/2021 | Guo | G06T 7/11 |
| 2022/0101635 | A1* | 3/2022 | Koivisto | G06N 3/084 |

OTHER PUBLICATIONS

Guo et al., "Learning Meta Face Recognition in Unseen Domains", In Proceedings of the IEEE/CVF Conference on Computer Vision and Pattern Recognition, Mar. 25, 2020 (pp. 6163-6172).

* cited by examiner

250

Covariance matrix of positive pairs $$\Sigma^+ = \frac{1}{N-1} \sum_{i=1}^{N} \left(r_i^+ - \mu^+\right)\left(r_i^+ - \mu^+\right)^T$$

Covariance matrix of negative pairs $$\Sigma^- = \frac{1}{N-1} \sum_{i=1}^{N} \left(r_i^- - \mu^-\right)\left(r_i^- - \mu^-\right)^T$$

Cross Domain Triplet Loss $$l_{cdt}(^iT,^jT;\theta_r) = \frac{1}{B}\sum_{b=1}^{B}\left[\frac{1}{HW}\sum_{h=1}^{H}\sum_{w=1}^{W} d_{j,\Sigma^+}^2\left([f_r(^ia_b)]_{h,w},[f_r(^ip_b)]_{h,w}\right) - \frac{1}{HW}\sum_{h=1}^{H}\sum_{w=1}^{W} d_{j,\Sigma^-}^2\left([f_r(^ia_b)]_{h,w},[f_r(^in_b)]_{h,w}\right) + \tau\right]_+$$

FIG. 5

FACE RECOGNITION FROM UNSEEN DOMAINS VIA LEARNING OF SEMANTIC FEATURES

RELATED APPLICATION INFORMATION

This application claims priority to Provisional Application No. 63/111,842, filed on Nov. 10, 2020, and Provisional Application No. 63/114,013, filed on Nov. 16, 2020, the contents of both of which are incorporated herein by reference in their entirety.

BACKGROUND

Technical Field

The present invention relates to face recognition models and, more particularly, to improving face recognition from unseen domains via learning of semantic features.

Description of the Related Art

Face recognition using deep neural networks has shown promising outcomes on popular evaluation benchmarks. Many current methods base their approaches on the assumption that the training data and the test data have similar distributions. However, when deployed to real-world scenarios, those models often do not generalize well to test data with unknown statistics. In face recognition applications, this may mean a shift in attributes such as ethnicity, gender or age between the training data and the evaluation data. On the other hand, collecting and labelling more data along the underrepresented attributes is costly. Therefore, given existing data, training algorithms are needed that can yield universal face representations and in turn, be applicable across such diverse scenarios.

SUMMARY

A method for improving face recognition from unseen domains by learning semantically meaningful representations is presented. The method includes obtaining face images with associated identities from a plurality of datasets, randomly selecting two datasets of the plurality of datasets to train a model, sampling batch face images and their corresponding labels, sampling triplet samples including one anchor face image, a sample face image from a same identity, and a sample face image from a different identity than that of the one anchor face image, performing a forward pass by using the samples of the selected two datasets, finding representations of the face images by using a backbone convolutional neural network (CNN), generating covariances from the representations of the face images and the backbone CNN, the covariances made in different spaces by using positive pairs and negative pairs, and employing the covariances to compute a cross-domain similarity loss function.

A non-transitory computer-readable storage medium comprising a computer-readable program for improving face recognition from unseen domains by learning semantically meaningful representations is presented. The computer-readable program when executed on a computer causes the computer to perform the steps of obtaining face images with associated identities from a plurality of datasets, randomly selecting two datasets of the plurality of datasets to train a model, sampling batch face images and their corresponding labels, sampling triplet samples including one anchor face image, a sample face image from a same identity, and a sample face image from a different identity than that of the one anchor face image, performing a forward pass by using the samples of the selected two datasets, finding representations of the face images by using a backbone convolutional neural network (CNN), generating covariances from the representations of the face images and the backbone CNN, the covariances made in different spaces by using positive pairs and negative pairs, and employing the covariances to compute a cross-domain similarity loss function.

A system for improving face recognition from unseen domains by learning semantically meaningful representations is presented. The system includes a memory and one or more processors in communication with the memory configured to obtain face images with associated identities from a plurality of datasets, randomly select two datasets of the plurality of datasets to train a model, sample batch face images and their corresponding labels, sample triplet samples including one anchor face image, a sample face image from a same identity, and a sample face image from a different identity than that of the one anchor face image, perform a forward pass by using the samples of the selected two datasets, find representations of the face images by using a backbone convolutional neural network (CNN), generate covariances from the representations of the face images and the backbone CNN, the covariances made in different spaces by using positive pairs and negative pairs, and employ the covariances to compute a cross-domain similarity loss function.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein:

FIG. 5 is a block/flow diagram of exemplary equations for improving face recognition from unseen domains by learning semantically meaningful representations, in accordance with embodiments of the present invention;

DETAILED DESCRIPTION OF PREFERRED EMBODIMENTS

Figure 1:
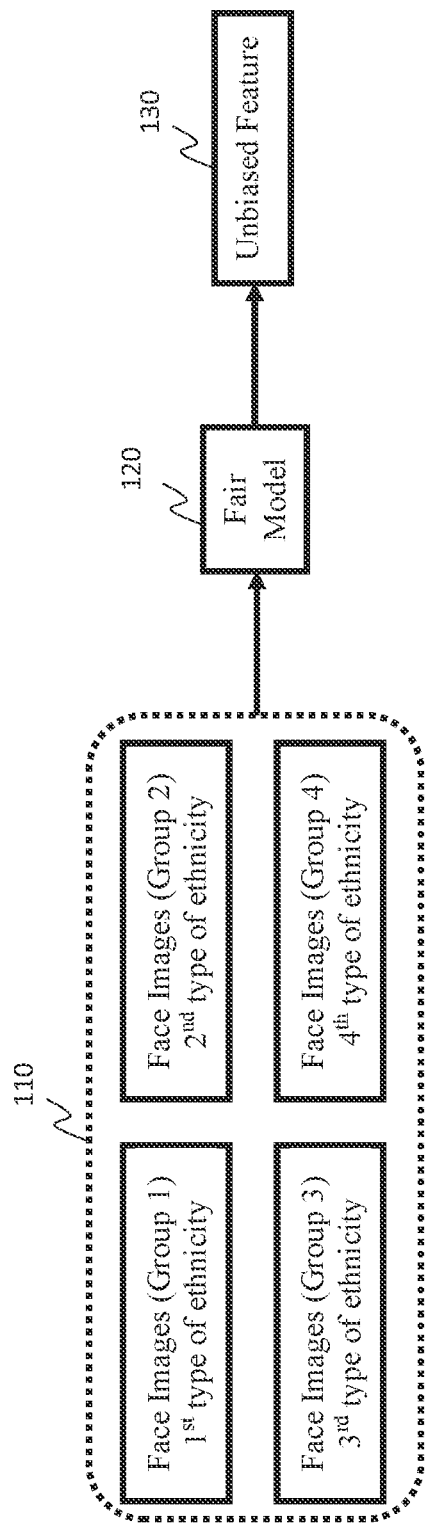
FIG. 1 is a block/flow diagram of an exemplary schematic for learning a fair model that can output features that are unbiased to specific variations in the training data, in accordance with embodiments of the present invention.

Domain generalization has emerged to address certain challenges but is mainly used for object classification with limited number of classes. Domain generalization aims to employ multiple labeled source domains with different distributions to learn a model that generalizes well to unseen target data at test time. However, many domain generalization methods are tailored to closed-set scenarios and thus, not directly applicable if the label spaces of the domains are disjoint. Generalized face recognition is a prominent example of open-set applications with a very large scale of categories, encouraging the need for further research in this area.

The exemplary embodiments introduce an approach to improve the issue presented from face recognition from unseen domains by learning semantically meaningful representations. In training a model, it is beneficial to exploit notions of semantic consistency between training data coming from various sources. As a result, the exemplary embodiments introduce a Cross-Domain Triplet (CDT) loss, a loss based on the triplet objective, that learns useful features by adopting two domains, where one domain provides similarity metrics to learn compact feature clusters of identities from another domain. The similarity metrics are encoded by covariance matrices.

The exemplary embodiments of the present invention introduce the CDT loss, which leverages the information jointly included in two observed domains to provide better alignment of the domains. The CDT loss first, takes into account similarity metrics of one data distribution, and then in a similar fashion to the triplet loss, uses the metrics to enforce compact feature clusters of identities that belong to another domain. Intuitively, CDT loss discriminatively correlates explicit metrics obtained from one domain with triplet samples from another domain in a unified loss function to be minimized within a network, which leads to better alignment of the training domains. The exemplary embodiments have also incorporated the loss in a meta-learning pipeline, to further enforce the network parameters to learn generalized features under domain shift.

Instead of using class specific covariance matrices, the exemplary embodiments cast the problem in feature residual space of positive and negative pairs and subsequently estimate the similarity metric of positive and negative pairs in one domain. Next, the exemplary embodiments utilize triplets of another domain to learn compact clusters of individuals. As supported by theoretical insights and experimental evaluations, CDT loss aligns the two domains in a discriminative manner. Furthermore, in a meta-learning framework, the network parameters are further enforced to learn generalized features under domain shift.

A recent research effort in this area is Meta Face Recognition (MFR), in which a loss is composed of distances of hard negative and positive samples, identity classification and the distance between domain centers. Furthermore, simply enforcing the mean of domains does not necessarily align the distributions of the domains and may lead to undesirable effects, e.g., aligning different class samples from different domains. As a result, this loss component does not always improve the recognition.

To summarize, the exemplary embodiments introduce an effective CDT loss function which explicitly transfers the similarity metric existing in one domain, to learn compact clusters of identities from another domain. This, results in learning semantically meaningful representations for face recognition from unseen domains. To further expose the network parameters to domain shift, under which more generalized features are obtained, the exemplary embodiments also incorporate the new loss in a model-agnostic learning pipeline.

In particular, the approach to improving the problem of face recognition from unseen domains by learning semantically meaningful representations is presented. In training a model, it is beneficial to exploit notions of semantic consistency between data coming from different distributions. The exemplary methods learn semantically meaningful features by enforcing compact clusters of identities from one domain, where the compactness is measured by underlying similarity metric that belongs to another domain with different statistics. In fact, the exemplary embodiments distill the knowledge encoded as a similarity metric across the domains with different label spaces.

The exemplary architecture follows an image/face recognition design. The exemplary architecture includes a representation-learning network $f_r(\bullet, \theta_r)$, parametrized by $\theta_r$, an embedding network $f_e(\bullet, \theta_e)$, parametrized by $\theta_e$ and a classifier network $f_c(\bullet, \theta_c)$, parametrized by $\theta_c$, $f_r(\bullet)$ is the backbone which will be finally used to extract generalized features in test time. Both $f_c(\bullet, \theta_c)$ and $f_e(\bullet, \theta_e)$ are light networks, e.g., a couple of Fully Connected (FC) layers, which take inputs from $f_r(\bullet)$. More specifically, forwarding an image I through $f_r(\bullet)$ outputs a tensor $f_r(I) \in \mathbb{R}^{H \times W \times D}$, after being flattened, acts as input to the classifier $f_c(\bullet)$ and embedding network $f_e(\bullet)$.

Before delving into more details, some basic concepts used in the formulation are reviewed. Then, contributions to learn generalized features from multiple source domains are provided and the solution is incorporated into a model-agnostic algorithm using meta-learning.

Bold lower-case letters (e.g., x) are used to show column vectors and bold upper-case letters (e.g., X) are used for matrices. The d×d identity matrix is denoted by $I_d$. By a tensor $\chi$, a multi-dimensional array of order k is alluded to, e.g., $\chi \in \mathbb{R}^{d_1 \times \cdots \times d_k}$. $[\chi]_{i, j, \ldots, k}$ denotes the element at position $\{i, j, k\}$ in $\chi$.

In Riemannian geometry, the Euclidean space $\mathbb{R}^d$ is a Riemannian manifold equipped with the inner product defined as $\langle x, y \rangle = x^T \Sigma y$, $x, y \in \mathbb{R}^d$. The class of Mahalanobis distances in $\mathbb{R}^d$, $d: \mathbb{R}^d \times \mathbb{R}^d \to \mathbb{R}^+$, is denoted by:

$$d_\Sigma(x,y) = \sqrt{(x-y)^T \Sigma (x-y)}$$

where $\Sigma \in \mathbb{R}^{d \times d}$ is a Positive Semi-Definite (PSD) matrix. This boils down to the Euclidean ($l_2$) distance when the metric matrix is chosen to be $I_d$. The motivation behind Mahalanobis metric learning is to determine $\Sigma$ such that $d_\Sigma(\bullet, \bullet)$ endows certain useful properties by expanding or shrinking axes in $\mathbb{R}^d$.

In a general deep neural network for metric learning, one relies on a FC layer with weight matrix $W \in \mathbb{R}^{D \times d}$ immediately before a loss layer (e.g., contrastive or triplet) to provide the embeddings of the data to a reduced dimension space. Then, given the fact that $\Sigma$ is a PSD matrix and can be decomposed as $\Sigma = W^T W$, the squared $l_2$ distance between two samples x and y (of a batch) passing through a network is computed as:

$$d_\Sigma^2(x, y) = \|W(f(x) - f(y))\|_2^2$$
$$= (f(x) - f(y))^T \sum (f(x) - f(y))$$

where $f(x) \in \mathbb{R}^d$ denotes functionality of the network on an image x.

Formally, a d×d covariance matrix (d is the dimension of feature map) can be constructed from a set of N observations (feature vectors) $\mathbb{O} = \{o_i\}_{i=1}^N$, $o_i \in \mathbb{R}^d$, as follows:

$$\sum = \frac{1}{N-1} \sum_{i=1}^{N} (o_i - \mu)(o_i - \mu)^T$$

where $\mu = \frac{1}{N} \sum_{i=1}^{N} o_i$.

A covariance matrix encodes second-order statistics of its input feature vectors. This motivates to estimate the underlying distribution of the data in such a single compact representation. Recent work on few-shot learning also demonstrates benefits of utilizing class specific covariance matrices to measure the distribution consistency between query samples and specific class samples. The exemplary embodiments use positive (negative) image pairs to denote face images with equal (different) identities. Moreover, a triplet, (anchor, positive, negative), includes one anchor face image, another sample from the same identity and one image from a different identity.

Regarding cross-domain similarity learning, the exemplary embodiments tackle the face recognition scenario where during training m source domains each with different attributes like ethnicity are observed. At test time, a new target domain is presented to the network which has samples of individuals with different identities and attributes. The exemplary embodiments formulate this problem as optimizing a network using a novel loss based on the triplet loss objective function, which is referred to as a Cross-Domain Triplet (CDT) loss.

The cross-domain triplet loss accepts inputs from two domains $^i\mathcal{D}$ and $^j\mathcal{D}$, estimates underlying residual distributions of positive and negative pairs from one domain (e.g., $^j\mathcal{D}$), and measures the distance between (anchor, positive) and (anchor, negative) samples of the other domain (e.g., $^i\mathcal{D}$). Then using the computed distances and a pre-defined margin, the standard triplet loss function is applied to align the two distributions.

In one instance, let $^j\mathbb{T} = \{^j(a, p, n)_b\}_{b=1}^{B_j}$ represent a batch of $B_j$ triplets from the j-th domain, $j \in 1 \ldots m$, from which positive samples $^j\mathbb{I} = \{^j(a, p)_b\}_{b=1}^{B_j}$ can be considered. For simplicity, the exemplary methods drop the superscript j. The exemplary methods combine all local descriptors of each image to estimate the underlying distribution by a covariance matrix. Specifically, the exemplary embodiments forward each positive image pair (a, p), through $f_r(\cdot)$ to obtain the feature tensor representation $f_r(a), f_r(p) \in \mathbb{R}^{H \times W \times D}$. The exemplary embodiments cast the problem in the space of pairwise differences.

Therefore, the tensor is defined as: $\mathcal{R}^+ = f_r(a) - f_r(p)$. Next, the exemplary embodiments flatten the resulting tensor $\mathcal{R}^+$ into vectors $\{r_i^+\}_{i=1}^{HW}$, $r_i^+ \in \mathbb{R}^D$.

This allows the calculation of a covariance matrix of positive pairs in pairwise difference space as:

$$\sum{}^+ = \frac{1}{N-1} \sum_{i=1}^{N} (r_i^+ - \mu^+)(r_i^+ - \mu^+)^T$$

where $N = BHW$ and $\mu^+ = \frac{1}{N} \sum_{i=1}^{N} r_i^+$.

Similarly, using a batch of B negative pairs $\mathbb{I}^- = \{(a, n)_b\}_{b=1}^B$, the exemplary methods find $\mathcal{R}^- = f_r(a) - f_r(n)$ for each (a, n) and flatten $\mathcal{R}^-$ into vectors $\{r_i^-\}_{i=1}^{HW}$; $r_i^- \in \mathbb{R}^D$.

This enables a covariance matrix of negative pairs to be defined as:

$$\sum{}^- = \frac{1}{N-1} \sum_{i=1}^{N} (r_i^- - \mu^-)(r_i^- - \mu^-)^T$$

where $N = BHW$ and $\mu^- = \frac{1}{N} \sum_{i=1}^{N} r_i^-$.

Considering that a batch of images has adequate samples, this will make sure a valid PSD covariance matrix is obtained, since each face image has HW samples in covariance computations. Furthermore, samples from a large batch-size then can satisfactorily approximate the domain distributions.

The CDT loss works in a similar fashion by utilizing the Mahalanobis distance function, $d_\Sigma^2(\bullet, \bullet)$ defined above, to compute distance of samples using the similarity metric from another domain. Given triplet images $^i\mathbb{T}$ from domain $^i\mathcal{D}$ and $^j\Sigma^+, ^j\Sigma^-$ from domain $^j\mathcal{D}$ computed via the covariance matrix of positive and negative pairs, respectively, it is defined as:

$$l_{cdt}(^i\mathbb{T}, ^j\mathbb{T}; \theta_r) = \frac{1}{B} \sum_{b=1}^{B} \left[ \frac{1}{HW} \sum_{h=1}^{H} \sum_{w=1}^{W} d_{j\Sigma^+}^2([f_r(^i a_b)]_{h,w}, [f_r(^i p_b)]_{h,w}) - \frac{1}{HW} \sum_{h=1}^{H} \sum_{w=1}^{W} d_{j\Sigma^-}^2([f_r(^i a_b)]_{h,w}, [f_r(^i n_b)]_{h,w}) + \tau \right]_+$$

where $\tau$ is a pre-defined margin and $[\bullet]_+$ is the hinge function.

The exemplary methods utilize class balanced sampling to provide inputs to both covariance and CDT loss calculations as this has been shown to be more effective in long-tailed recognition problems.

Figure 4:
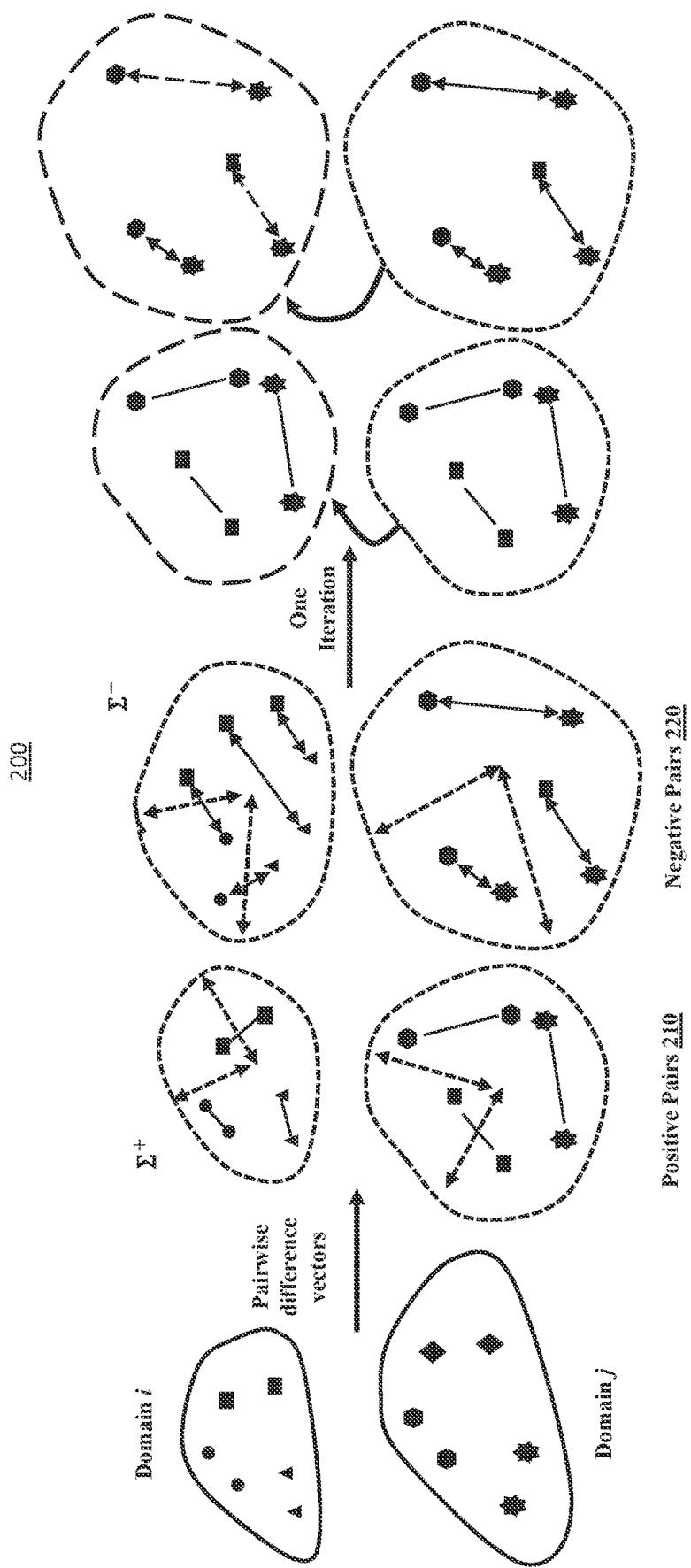
FIG. 4 is a block/flow diagram of an exemplary schematic of the cross-domain triplet loss, in accordance with embodiments of the present invention.

Central to the proposal is the distance of the form $r^T \Sigma r$, defined on samples of two domains with different distributions. If r is drawn from a normal distribution, then multiplication with $\Sigma$ results in a distance according to the empirical covariance matrix, where optimizing over the entire points means alignment of the domains. More specifically, assuming that $\Sigma$ is SPD, then eigen-decomposition exists, e.g., $\Sigma = V \Lambda V^T$. Expanding the term results in:

$$r^T \Sigma r = (\Lambda^{1/2} V^T r)^T (\Lambda^{1/2} V^T r) = \|\Lambda^{1/2} V^T r\|_2^2$$

which correlates r with the eigenvectors of Σ weighted by the corresponding eigenvalues. This attains its maximum when r is in the direction of leading eigenvectors of the empirical covariance matrix Σ. In other words, as the eigenvectors of Σ are directions where its input data has maximal variance, minimizing this term over r vectors results in alignment of the two data sources. FIG. 4, described below, depicts the underlying process in the loss.

Following recent trends in domain generalization tasks, the exemplary embodiments employ gradient-based meta-train/meta-test episodes under a model-agnostic learning framework to further expose the optimization process to distribution shift. Algorithm 1, reproduced below, summarizes the overall training process. More specifically, in each round of training, the exemplary embodiments split input source domains into one meta-test and the remaining meta-train domains. The exemplary embodiments randomly sample B triplets from each domain to calculate the losses.

---
Algorithm 1: Learning Generalized Features for Face Recognition.
---

Input:
    Source domains $\mathcal{D} = [^1\mathcal{D}, {}^2\mathcal{D}_2, \ldots, {}^m\mathcal{D}]$;
    Batch size B;
    Hyper-parameters α, β, λ;
Output:
    Learned parameters: $\hat{\ominus} = \{\hat{\theta}_r, \hat{\theta}_c, \hat{\theta}_e\}$
1:   Initialize parameters $\ominus = \{\theta_r, \theta_c, \theta_e\}$
2:   repeat
3:     Initialize the gradient accumulator: $G_\ominus \leftarrow 0$
4:     for each ${}^i\mathcal{D}$ (meta-test domain) in $\mathcal{D}$ do
5:       for each ${}^j\mathcal{D}$, i ≠ j (meta-train domain) in $\mathcal{D}$ do
6:         Sample B triplets ${}^i\mathbb{T}$, from B identities of ${}^i\mathcal{D}$
7:         Sample B triplets ${}^j\mathbb{T}$, from B identities of ${}^j\mathcal{D}$
8:         Compute $L_s \leftarrow \mathbb{E}[l_{cls}({}^j\mathbb{T}; \theta_r, \theta_c)] + l_{trp}({}^j\mathbb{T}; \theta_r, \theta_e)$
9:         $\ominus' = \ominus - \alpha \nabla_{\ominus} L_s$
10:        Compute ${}^j\Sigma^+$ and ${}^j\Sigma^-$ using positive and negative pairs of ${}^j\mathbb{T}$
11:        Compute $L_t \leftarrow \mathbb{E}[l_{cls}({}^i\mathbb{T}; \theta_r', \theta_c')] + l_{trp}({}^i\mathbb{T}; \theta_r', \theta_e') + l_{cdt}({}^i\mathbb{T}, {}^j\mathbb{T}; \theta_r')$
12:      end for
13:     $G_\ominus \leftarrow G_\ominus + \lambda \nabla_\ominus L_s + (1-\lambda)\nabla_\ominus L_t$
14:    end for
15:    Update model parameters: $\ominus = \ominus - \frac{\beta}{m} G_\ominus$
16:   until convergence First, the exemplary embodiments calculate two covariance matrices, $\Sigma^+$ and $\Sigma^-$, as well as a temporary set of parameters, $\Theta'$, based on the summation of a classification and the triplet losses, $L_s$. The network is trained to semantically perform well on the held-out meta-test domain, hence $\Sigma^+$, $\Sigma^-$ and $\Theta'$ are used to compute the loss on the meta-test domain, $L_t$. This loss has an additional CDT loss, $l_{cdt}$, to also involve cross-domain similarity for domain alignment. In the end, the model parameters are updated by accumulated gradients of both $L_s$ and $L_t$, as this has been shown to be more effective than the original model-agnostic meta-learning (MAML). In the exemplary embodiments, the accumulated loss $L_t$ provides extra regularization to update the model with higher-order gradients.

Having a classification training signal is beneficial to face recognition applications. As a result, the exemplary methods use the Large Margin Cosine Loss (LMCL) as the identity classification loss which is as follows:

$$l_{cls}(I_i; \theta_r, \theta_c) = -\log \frac{\exp(sw_{y_i}^T f_c(I_i) - m)}{\exp(sw_{y_i}^T f_c(I_i) - m) + \sum_{y_j \neq y_i} \exp(sw_{y_j}^T f_c(I_i))}$$

where $y_i$ is the ground-truth identity of the image $I_i$, $f_c(\cdot)$ is the classifier network, $w_{y_i}$ is the weight vector of the identity $y_i$, s is an scaling multiplier and m is the margin.

The exemplary embodiments further encourage $f_r$ network to learn locally compact semantic features according to identities from a domain. To this end, the exemplary methods use the triplet loss. Using the standard $l_2$ distance function $\|\cdot\|_2$, the triplet loss function provides a training signal such that for each triplet, the distance between a and n becomes greater than the distance between a and p plus a predefined margin p. More formally:

$$l_{trp}(\mathbb{T}; \theta_r, \theta_e) = \frac{1}{B}\sum_{b=1}^{B}[\|f_e(a) - f_e(p)\|_2^2 - \|f_e(a) - f_e(n)\|_2^2 + \rho]_+$$

Note that $w_y$, $f_c(I)$ and $f_e(I)$ are $l_2$ normalized prior to computing the loss. Furthermore, $f_c(\cdot)$ and $f_e(\cdot)$ operate on the extracted representation by $f_r(\cdot)$.

In summary, the exemplary methods introduce a cross-domain metric learning loss, referred to as the Cross-Domain Triplet (CDT) loss, to improve face recognition in unseen domains. The CDT loss encourages learning semantically meaningful features by enforcing compact feature clusters of identities from one domain, where the compactness is measured by underlying similarity metrics that belong to another training domain with different statistics. Intuitively, the CDT loss discriminatively correlates explicit metrics derived from one domain with triplet samples from another domain in a unified loss function to be minimized within a network, which leads to better alignment of the training domains. The network parameters are further enforced to learn generalized features under the domain shift, in a model agnostic learning pipeline. Unlike the recent work of Meta Face Recognition, the exemplary method does not require careful hard-pair sample mining and filtering strategy during training.

FIG. 1 is a block/flow diagram of an exemplary schematic for learning a fair model that can output features that are unbiased to specific variations in the training data, in accordance with embodiments of the present invention.

Face recognition using deep neural networks has shown promising outcomes on popular evaluation benchmarks. Many current methods base their approaches on the assumption that the training data and the test data share data distributions. However, when deployed to real-world scenarios, those models often fail as they are not able to handle test data with unknown statistics. In face recognition applications, this means the shift in the attributes such as ethnicity, gender or age of the training data and the evaluation data. On the other hand, collecting and labeling more data along the underrepresented attributes is costly. Therefore, given existing data, training algorithms are needed that can achieve universal face representations applicable across such diverse scenarios. Here, the exemplary embodiments tackle the face recognition scenario where during training several source domains each with different attributes like ethnicity and gender are observed. At test time, a new target domain is presented to the network which has samples of individuals with different identities and attributes. As shown in FIG. 1, the exemplary embodiments aim to learn a fair model 120 that can output features 130 that are unbiased to specific variations in the training data such as ethnicity 110.

Since the model is trained using multiple datasets containing diverse data distributions, it can handle various scenarios when the test data is from an unknown distribution, e.g., ethnicities. Therefore, the final model can produce robust performances when deployed in a new environment, e.g., a new country.

Figure 2:
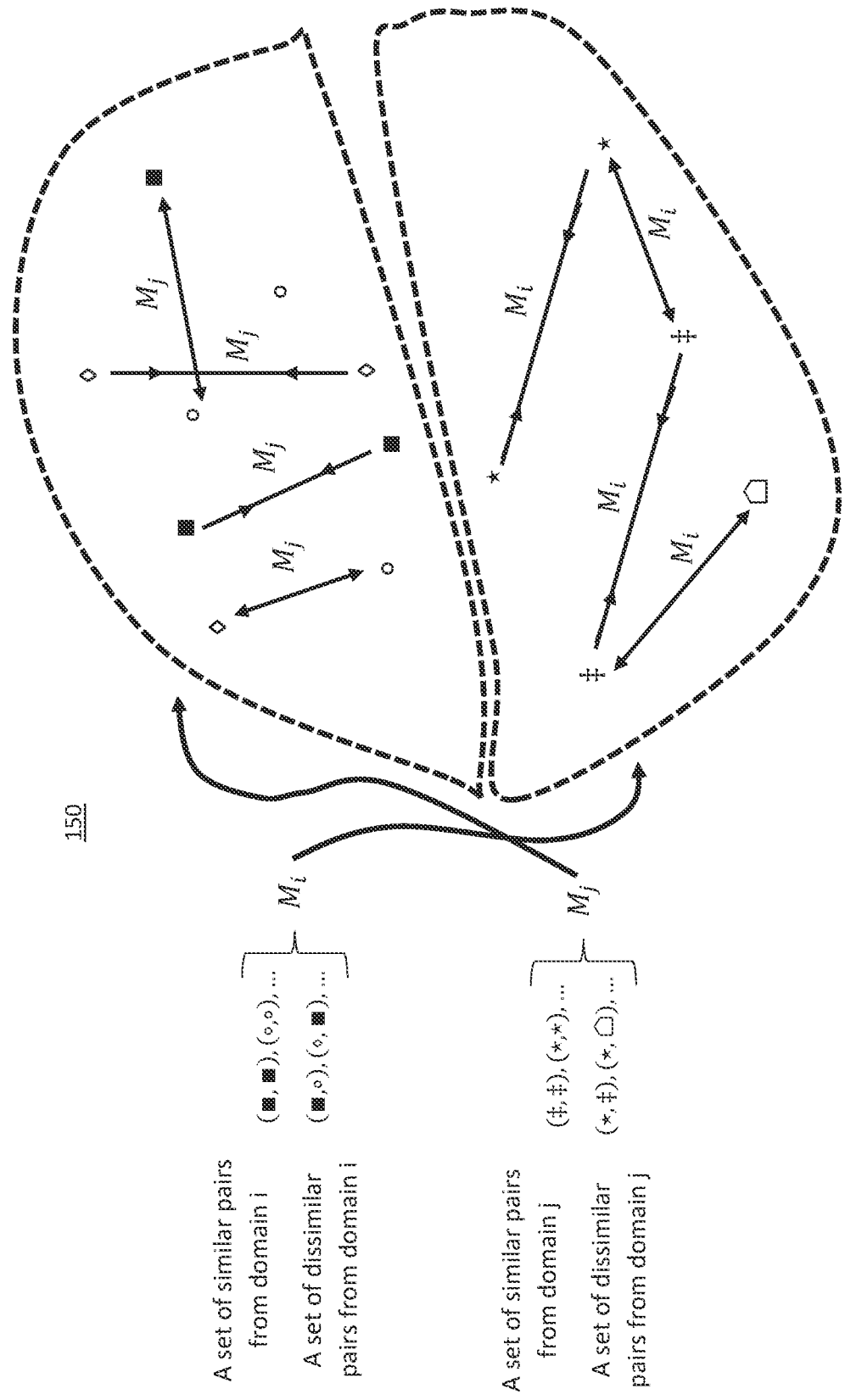
FIG. 2 is a block/flow diagram of an exemplary schematic for making and transferring a similarity metric matrix from each domain to learn compact clusters of samples from another domain, in accordance with embodiments of the present invention.

FIG. 2 is a block/flow diagram of an exemplary schematic 150 for making and transferring a similarity metric matrix from each domain to learn compact clusters of samples from another domain, in accordance with embodiments of the present invention.

The exemplary methods show that in training a model, it is beneficial to exploit notions of semantic consistency between data coming from different distributions. The exemplary embodiments learn semantically meaningful features by enforcing compact clusters of identities from one domain, where the compactness is measured by underlying similarity metrics that belong to another domain with different statistics. In fact, the exemplary embodiments distill the knowledge encoded as a similarity metric across the domains with different label spaces.

More specifically, the exemplary methods formulate the problem of face recognition from unseen domain as optimizing a network using a new triplet loss objective function. The new objective function takes into account the similarity learned in one data distribution, to learn semantic similarities on another domain to learn more generalizable features. The exemplary methods make use of covariance matrices of samples of the domains as data distributions. Then, the exemplary methods transfer the distribution defined to the other domain to make the distance between an anchor and a positive sample small while simultaneously making the distance between an anchor and negative sample large. The new loss is referred to as the Cross Domain Similarity Loss, which works in a similar fashion as the Mahalanobis distance function to compute the distance of samples using the similarity metric from another domain in a triple-wise training strategy.

Figure 3:
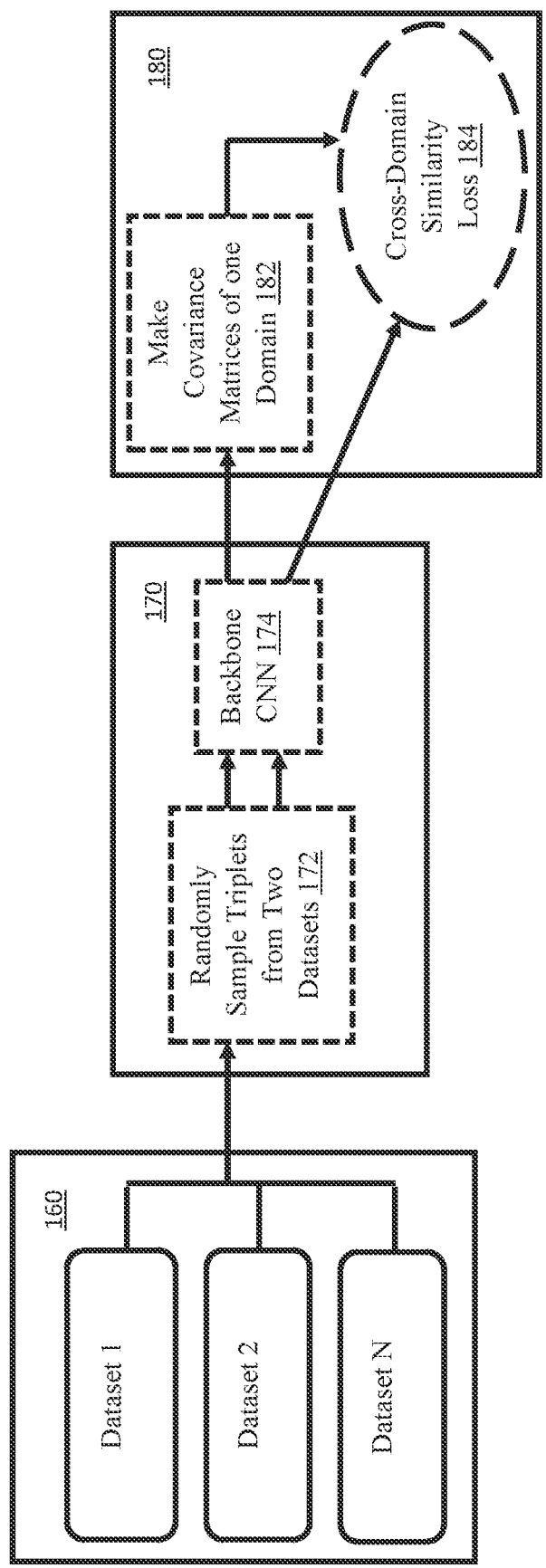
FIG. 3 is a block/flow diagram of an exemplary training process, in accordance with embodiments of the present invention.

FIG. 3 is a block/flow diagram of an exemplary training process, in accordance with embodiments of the present invention.

Regarding the training datasets 160, the input face images can come from N datasets which are denoted as Dataset1, Dataset2, . . . , Dataset N. Each Dataset includes face images with associated identities. For each identity, there might be some samples (e.g., sample images of the same person).

Regarding the backbone Convolutional Neural Network (CNN) 174 and sampling 172, out of all available N source datasets 160, two datasets are randomly selected for training a model. Then batch images and their corresponding labels are sampled. Next the exemplary methods sample triplet samples which include one anchor face image, another sample image from the same identity and one sample from a different identity from the anchor image.

The exemplary methods perform a forward pass using the samples of two datasets and find the representation of the images using a backbone CNN 174.

Regarding loss construction 180, and in particular, covariance construction 182, the exemplary methods use the output representation of the backbone CNN 174 from one dataset to generate covariance matrices that encode the underlying distribution of the data. In fact, the exemplary methods make covariances in difference spaces using (anchor, positive) pairs (e.g., face images from the same identity) and (anchor, negative) pairs (e.g., face images from different identities).

Regarding the cross-domain similarity loss function 184, the exemplary methods then use the two covariances to find the distance between (anchor, positive) and (anchor, negative) pairs coming from other datasets. The exemplary methods make the distance between an anchor and a positive sample small while simultaneously making the distance between an anchor and negative sample large.

FIG. 4 is a block/flow diagram of an exemplary schematic of the cross-domain triplet loss 200, in accordance with embodiments of the present invention.

Given samples of two domain i and j with their associated labels, covariance matrices in difference spaces of positive and negative pairs of domain i are calculated and used to make positive and negative pairs of domain j close and far away, respectively. This makes compact clusters of identities while aligning the distributions. It is noted that alignments of positive and negative pairs are done simultaneously in a unified manner.

FIG. 5 is a block/flow diagram of exemplary equations for improving face recognition from unseen domains by learning semantically meaningful representations, in accordance with embodiments of the present invention.

The equations 250 include a covariance matrix of positive pairs, a covariance matrix of negative pairs, and a cross-domain triplet loss.

Figure 6:
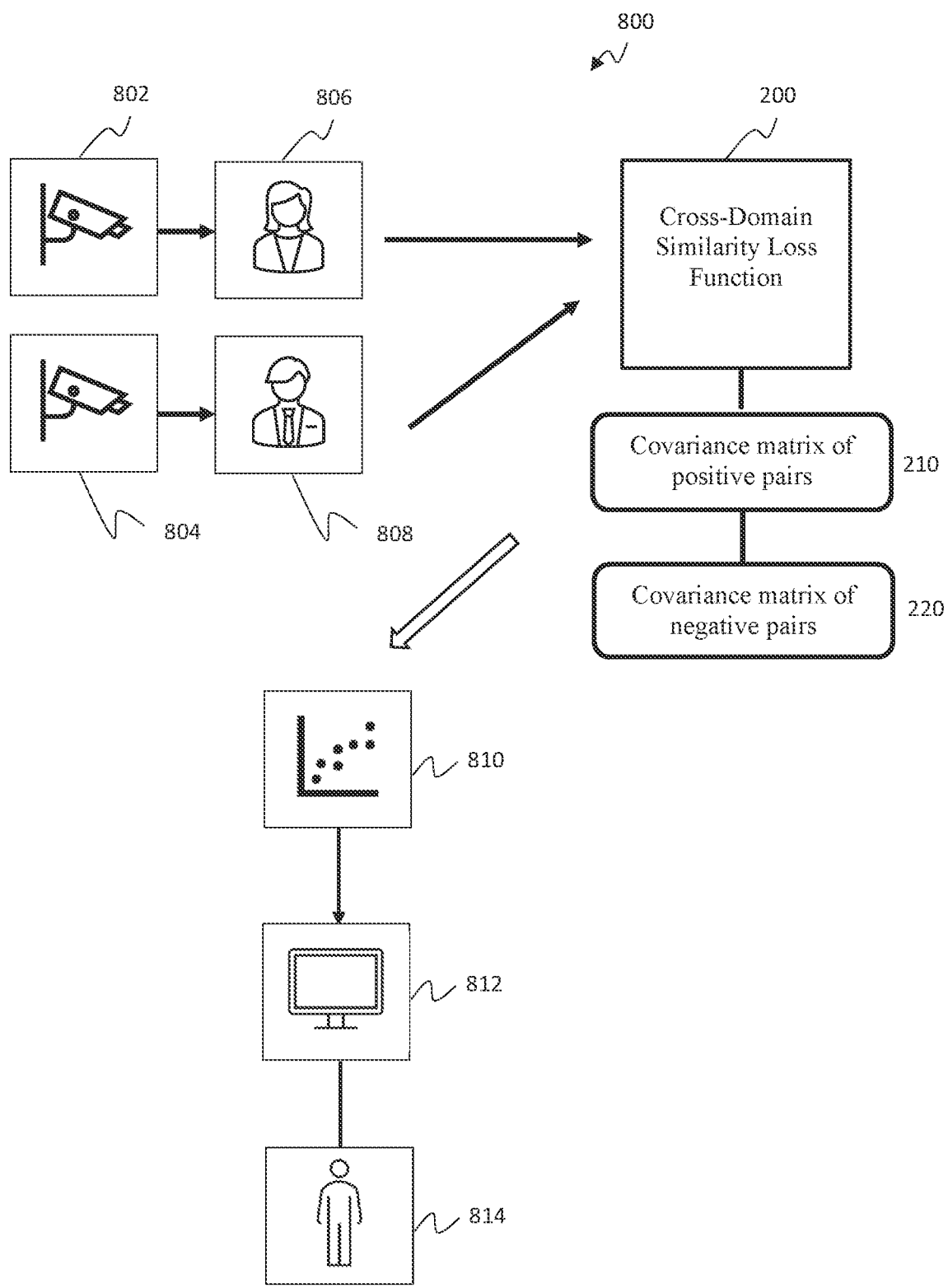
FIG. 6 is an exemplary practical application for improving face recognition from unseen domains by learning semantically meaningful representations, in accordance with embodiments of the present invention.

FIG. 6 is a block/flow diagram 800 of a practical application for improving face recognition from unseen domains by learning semantically meaningful representations, in accordance with embodiments of the present invention.

In one practical example, a first camera 802 can detect a first person 806 of a first identity and a second camera 804 can detect a second person 808 of a second identity. The features 806 and 808 are processed by the cross-domain similarity loss function 200 by employing a covariance matrix of positive pairs 210 and a covariance matrix of negative pairs 220. The results 810 (e.g., identity) can be provided or displayed on a user interface 812 handled by a user 814.

Figure 7:
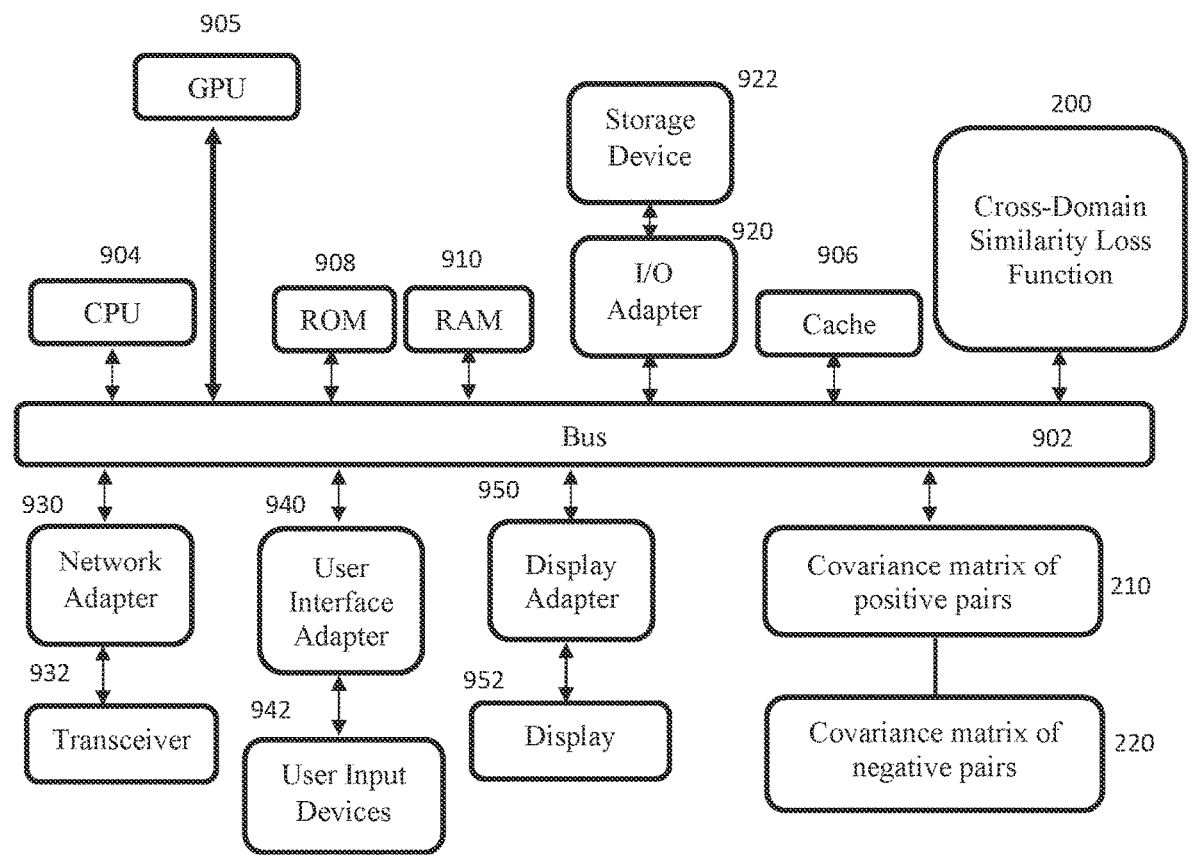
FIG. 7 is an exemplary processing system for improving face recognition from unseen domains by learning semantically meaningful representations, in accordance with embodiments of the present invention.

FIG. 7 is an exemplary processing system for improving face recognition from unseen domains by learning semantically meaningful representations, in accordance with embodiments of the present invention.

The processing system includes at least one processor (CPU) 904 operatively coupled to other components via a system bus 902. A GPU 905, a cache 906, a Read Only Memory (ROM) 908, a Random Access Memory (RAM) 910, an input/output (I/O) adapter 920, a network adapter 930, a user interface adapter 940, and a display adapter 950, are operatively coupled to the system bus 902. Additionally, the cross-domain similarity loss function 200 can be employed by a covariance matrix of positive pairs 210 and a covariance matrix of negative pairs 220.

A storage device 922 is operatively coupled to system bus 902 by the I/O adapter 920. The storage device 922 can be any of a disk storage device (e.g., a magnetic or optical disk storage device), a solid-state magnetic device, and so forth.

A transceiver 932 is operatively coupled to system bus 902 by network adapter 930.

User input devices 942 are operatively coupled to system bus 902 by user interface adapter 940. The user input devices 942 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present invention. The user input devices 942 can be the same type of user input device or different types of user input devices. The user input devices 942 are used to input and output information to and from the processing system.

A display device 952 is operatively coupled to system bus 902 by display adapter 950.

Of course, the processing system may also include other elements (not shown), as readily contemplated by one of skill in the art, as well as omit certain elements. For example, various other input devices and/or output devices can be included in the system, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system are readily contemplated by one of ordinary skill in the art given the teachings of the present invention provided herein.

Figure 8:
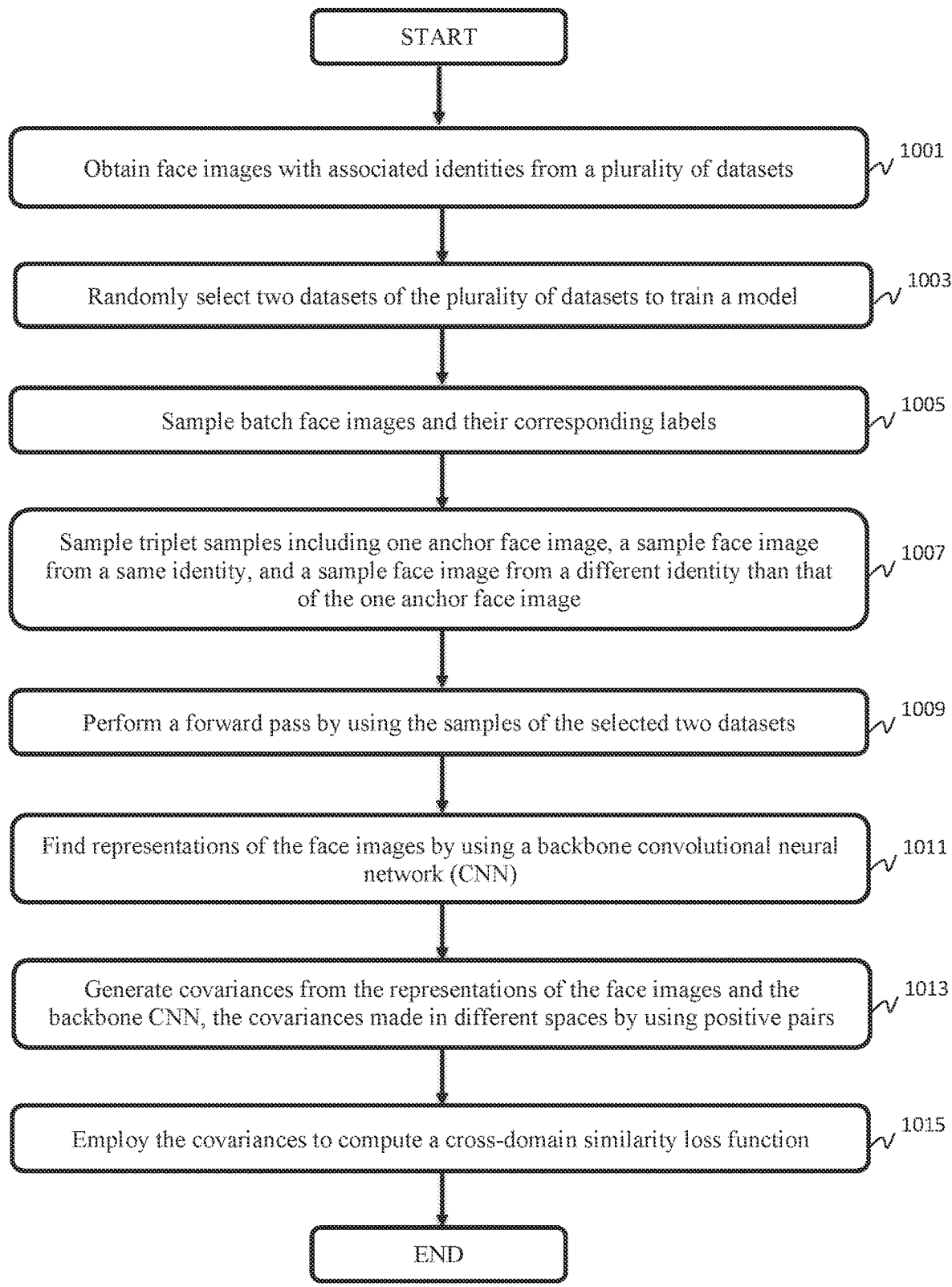
FIG. 8 is a block/flow diagram of an exemplary method for improving face recognition from unseen domains by learning semantically meaningful representations, in accordance with embodiments of the present invention.

FIG. 8 is a block/flow diagram of an exemplary method for improving face recognition from unseen domains by learning semantically meaningful representations, in accordance with embodiments of the present invention.

At block 1001, obtain face images with associated identities from a plurality of datasets.

At block 1003, randomly select two datasets of the plurality of datasets to train a model.

At block 1005, sample batch face images and their corresponding labels.

At block 1007, sample triplet samples including one anchor face image, a sample face image from a same identity, and a sample face image from a different identity than that of the one anchor face image.

At block 1009, perform a forward pass by using the samples of the selected two datasets.

At block 1011, find representations of the face images by using a backbone convolutional neural network (CNN).

At block 1013, generate covariances from the representations of the face images and the backbone CNN, the covariances made in different spaces by using positive pairs and negative pairs.

At block 1015, employ the covariances to compute a cross-domain similarity loss function.

As used herein, the terms "data," "content," "information" and similar terms can be used interchangeably to refer to data capable of being captured, transmitted, received, displayed and/or stored in accordance with various example embodiments. Thus, use of any such terms should not be taken to limit the spirit and scope of the disclosure. Further, where a computing device is described herein to receive data from another computing device, the data can be received directly from the another computing device or can be received indirectly via one or more intermediary computing devices, such as, for example, one or more servers, relays, routers, network access points, base stations, and/or the like. Similarly, where a computing device is described herein to send data to another computing device, the data can be sent directly to the another computing device or can be sent indirectly via one or more intermediary computing devices, such as, for example, one or more servers, relays, routers, network access points, base stations, and/or the like.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," "calculator," "device," or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical data storage device, a magnetic data storage device, or any suitable combination of the foregoing. In the context of this document, a computer readable storage medium may be any tangible medium that can include, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the present invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks or modules.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks or modules.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks or modules.

It is to be appreciated that the term "processor" as used herein is intended to include any processing device, such as, for example, one that includes a CPU (central processing unit) and/or other processing circuitry. It is also to be understood that the term "processor" may refer to more than one processing device and that various elements associated with a processing device may be shared by other processing devices.

The term "memory" as used herein is intended to include memory associated with a processor or CPU, such as, for example, RAM, ROM, a fixed memory device (e.g., hard drive), a removable memory device (e.g., diskette), flash memory, etc. Such memory may be considered a computer readable storage medium.

In addition, the phrase "input/output devices" or "I/O devices" as used herein is intended to include, for example, one or more input devices (e.g., keyboard, mouse, scanner, etc.) for entering data to the processing unit, and/or one or more output devices (e.g., speaker, display, printer, etc.) for presenting results associated with the processing unit.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that those skilled in the art may implement various modifications without departing from the scope and spirit of the invention. Those skilled in the art could implement various other feature combinations without departing from the scope and spirit of the invention. Having thus described aspects of the invention, with the details and particularity required by the patent laws, what is claimed and desired protected by Letters Patent is set forth in the appended claims.

What is claimed is:

1. A method for improving face recognition from unseen domains by learning semantically meaningful representations, the method comprising:
- obtaining face images with associated identities from a plurality of datasets;
- randomly selecting two datasets of the plurality of datasets to train a model;
- sampling batch face images and their corresponding labels;
- sampling triplet samples including one anchor face image, a sample face image from a same identity, and a sample face image from a different identity than that of the one anchor face image;
- performing a forward pass by using the samples of the selected two datasets;
- finding representations of the face images by using a backbone convolutional neural network (CNN);
- generating covariances from the representations of the face images and the backbone CNN, the covariances made in different spaces by using positive pairs and negative pairs; and
- employing the covariances to compute a cross-domain similarity loss function.

2. The method of claim 1, wherein the covariances encode underlying distributions of the selected two datasets.

3. The method of claim 1, wherein the positive pairs are face images from a same identity and negative pairs are face images from different identities.

4. The method of claim 1, wherein the cross-domain similarity loss function transfers a similarity metric existing in one domain to learn compact clusters of identities from another domain.

5. The method of claim 1, wherein the cross-domain similarity loss function accepts inputs from two domains, estimates underlying residual distributions of the positive and negative pairs from a first domain and measures a distance between positive and negative samples of the second domain.

6. The method of claim 1, wherein a covariance matrix of the positive pairs is given as:

$$\sum\nolimits^+ = \frac{1}{N-1} \sum_{i=1}^{N} (r_i^+ - \mu^+)(r_i^+ - \mu^+)^T$$

where N is a number of observations, $r_i^+$ is a tensor vector, and $$\mu^+ = \frac{1}{N} \sum_{i=1}^{N} r_i^+.$$

7. The method of claim 1, wherein a covariance matrix of the negative pairs is given as:

$$\sum\nolimits^- = \frac{1}{N-1} \sum_{i=1}^{N} (r_i^- - \mu^-)(r_i^- - \mu^-)^T$$

where N is a number of observations, $r_i^+$ is a tensor vector, and $$\mu^- = \frac{1}{N} \sum_{i=1}^{N} r_i^-.$$

8. A non-transitory computer-readable storage medium comprising a computer-readable program for improving face recognition from unseen domains by learning semantically meaningful representations, wherein the computer-readable program when executed on a computer causes the computer to perform the steps of:
- obtaining face images with associated identities from a plurality of datasets;
- randomly selecting two datasets of the plurality of datasets to train a model;
- sampling batch face images and their corresponding labels;
- sampling triplet samples including one anchor face image, a sample face image from a same identity, and a sample face image from a different identity than that of the one anchor face image;
- performing a forward pass by using the samples of the selected two datasets;
- finding representations of the face images by using a backbone convolutional neural network (CNN);
- generating covariances from the representations of the face images and the backbone CNN, the covariances made in different spaces by using positive pairs and negative pairs; and
- employing the covariances to compute a cross-domain similarity loss function.

9. The non-transitory computer-readable storage medium of claim 8, wherein the covariances encode underlying distributions of the selected two datasets.

10. The non-transitory computer-readable storage medium of claim 8, wherein the positive pairs are face images from a same identity and negative pairs are face images from different identities.

11. The non-transitory computer-readable storage medium of claim 8, wherein the cross-domain similarity loss function transfers a similarity metric existing in one domain to learn compact clusters of identities from another domain.

12. The non-transitory computer-readable storage medium of claim 8, wherein the cross-domain similarity loss function accepts inputs from two domains, estimates underlying residual distributions of the positive and negative pairs from a first domain and measures a distance between positive and negative samples of the second domain.

13. The non-transitory computer-readable storage medium of claim 8, wherein a covariance matrix of the positive pairs is given as:

$$\sum\nolimits^{+} = \frac{1}{N-1} \sum_{i=1}^{N} (r_i^+ - \mu^+)(r_i^+ - \mu^+)^T$$

where N is a number of observations, $r_i^+$ is a tensor vector, and $$\mu^+ = \frac{1}{N} \sum\nolimits_{i=1}^{N} r_i^+ .$$

14. The non-transitory computer-readable storage medium of claim 8, wherein a covariance matrix of the negative pairs is given as:

$$\sum\nolimits^{-} = \frac{1}{N-1} \sum_{i=1}^{N} (r_i^- - \mu^-)(r_i^- - \mu^-)^T$$

where N is a number of observations, $r_i^+$ is a tensor vector, and $$\mu^- = \frac{1}{N} \sum\nolimits_{i=1}^{N} r_i^- .$$

15. A system for improving face recognition from unseen domains by learning semantically meaningful representations, the system comprising:
- a memory; and
- one or more processors in communication with the memory configured to:
  - obtain face images with associated identities from a plurality of datasets;
  - randomly select two datasets of the plurality of datasets to train a model;
  - sample batch face images and their corresponding labels;
  - sample triplet samples including one anchor face image, a sample face image from a same identity, and a sample face image from a different identity than that of the one anchor face image;
  - perform a forward pass by using the samples of the selected two datasets;
  - find representations of the face images by using a backbone convolutional neural network (CNN);
  - generate covariances from the representations of the face images and the backbone CNN, the covariances made in different spaces by using positive pairs and negative pairs; and
  - employ the covariances to compute a cross-domain similarity loss function.

16. The system of claim 15, wherein the positive pairs are face images from a same identity and negative pairs are face images from different identities.

17. The system of claim 15, wherein the cross-domain similarity loss function transfers a similarity metric existing in one domain to learn compact clusters of identities from another domain.

18. The system of claim 15, wherein the cross-domain similarity loss function accepts inputs from two domains, estimates underlying residual distributions of the positive and negative pairs from a first domain and measures a distance between positive and negative samples of the second domain.

19. The system of claim 15, wherein a covariance matrix of the positive pairs is given as:

$$\sum\nolimits^{+} = \frac{1}{N-1} \sum_{i=1}^{N} (r_i^+ - \mu^+)(r_i^+ - \mu^+)^T$$

where N is a number of observations, $r_i^+$ is a tensor vector, and $$\mu^+ = \frac{1}{N} \sum\nolimits_{i=1}^{N} r_i^+ .$$

20. The system of claim 15, wherein a covariance matrix of the negative pairs is given as:

$$\sum\nolimits^{-} = \frac{1}{N-1} \sum_{i=1}^{N} (r_i^- - \mu^-)(r_i^- - \mu^-)^T$$

where N is a number of observations, $r_i^+$ is a tensor vector, and $$\mu^- = \frac{1}{N} \sum\nolimits_{i=1}^{N} r_i^-.$$

* * * * *